US005091724A

United States Patent [19]

Go

[11] Patent Number: 5,091,724

[45] Date of Patent: Feb. 25, 1992

[54] ANTI-THEFT DEVICE FOR A VEHICULAR ELECTRIC APPARATUS

[75] Inventor: Yasunao Go, Saitama, Japan

[73] Assignee: Pioneer Electronic Corporation, Tokyo, Japan

[21] Appl. No.: 707,318

[22] Filed: May 30, 1991

Related U.S. Application Data

[63] Continuation of Ser. No. 513,732, Apr. 24, 1990, abandoned.

[30] Foreign Application Priority Data

Sep. 29, 1989 [JP] Japan .................................. 1-256698

[51] Int. Cl.[5] .............................................. H04B 1/00

[52] U.S. Cl. ........................... 340/825.56; 340/825.31

[58] Field of Search ............... 340/426, 428, 527, 568, 340/652, 660, 825.3, 825.31, 825.34, 825.56, 825.32; 307/10.1, 10.2, 10.4, 10.5; 455/345, 346; 235/375, 382

[56] References Cited

U.S. PATENT DOCUMENTS

| | | | |
|---|---|---|---|
| 4,604,708 | 8/1986 | Lewis | 364/900 |
| 4,683,462 | 7/1987 | Takeda et al. | 340/825.32 |
| 4,805,233 | 2/1989 | Robitschko et al. | 455/346 |
| 4,838,377 | 6/1989 | Kozaki et al. | 340/426 |
| 4,914,314 | 4/1990 | Hirtz | 307/10.4 |

FOREIGN PATENT DOCUMENTS

| | | |
|---|---|---|
| 0108270 | 5/1984 | European Pat. Off. . |
| 0141468 | 5/1985 | European Pat. Off. . |
| 0269965 | 11/1987 | European Pat. Off. . |
| 0281674 | 11/1987 | European Pat. Off. . |
| 0291827 | 5/1988 | European Pat. Off. . |
| 3342003 | 6/1984 | Fed. Rep. of Germany . |
| 3421584 | 12/1985 | Fed. Rep. of Germany . |
| 3637019 | 5/1987 | Fed. Rep. of Germany . |
| 3629656 | 3/1988 | Fed. Rep. of Germany . |
| 3641230 | 4/1988 | Fed. Rep. of Germany . |
| 3806557 | 9/1988 | Fed. Rep. of Germany . |
| 3710924 | 10/1988 | Fed. Rep. of Germany . |
| 3740638 | 12/1988 | Fed. Rep. of Germany . |
| 3739670 | 3/1990 | Fed. Rep. of Germany . |

*Primary Examiner*—Donald J. Yusko
*Assistant Examiner*—Dervis Magistre
*Attorney, Agent, or Firm*—Sughrue, Mion, Zinn, Macpeak & Seas

[57] ABSTRACT

When a vehicular electric apparatus, such as an audio apparatus, is switched on, an anti-theft procedure is initiated. The electric apparatus is inhibited from becoming operational if a predetermined code is not input, when the electric apparatus is switched on after it was disconnected from a vehicle battery or after a prescribed period has passed.

2 Claims, 2 Drawing Sheets

ANTI-THEFT DEVICE FOR A VEHICULAR ELECTRIC APPARATUS

This is a continuation of application No. 07/513,732 filed Apr. 24, 1990, now abandoned.

BACKGROUND OF THE INVENTION

This invention relates to an anti-theft device for a vehicular electric apparatus such as an audio apparatus.

There is available an anti-theft device for a vehicular audio apparatus. The device is so designed that the audio apparatus can operate only after a user inputs a predetermined code by operating keys on the device each time the audic apparatus as a whole is connected to a power source. That is, even if the audio apparatus stolen is connected to a power source, it will not operate since the thief or a third person does not know the code.

However, this type of anti-theft device is useless in the case where the audio apparatus is stolen with the power source connected to it.

On the other hand, the power source is generally a vehicle battery. The battery is usually kept connected to a vehicular electric apparatus as long as the electric apparatus works normally and the battery is within its a service life. When the battery is replaced because of termination of its service life, it is necessary to input the code to make the electric apparatus operational. If the inputting of the code has not been carried out for many years, then the code may be forgotten, resulting in a problem that the electric apparatus cannot operate.

SUMMARY OF THE INVENTION

Accordingly, an object of this invention is to provide an anti-theft device for a vehicular electric apparatus, which can perform its role even if the electric apparatus is stolen with a power source connected to it.

Another object is to provide an anti-theft device for a vehicular electric apparatus, which can obviate such a trouble that the electric apparatus cannot operate because of forgetting the code to make the electric apparatus operational when a vehicle battery is replaced.

According to the present invention, an anti-theft device for a vehicular electric apparatus comprises:

connection detecting means for detecting disconnection of the electric apparatus as a whole from a power source;

code detecting means for detecting input of a predetermined code; and inhibition controlling means for inhibiting an operation of the electric apparatus if the input of the predetermined code is not detected by the code detecting means, when the electric apparatus is switched on after the disconnection was detected by the connection detecting means or every time a prescribed period has passed.

DETAILED DESCRIPTION OF THE PREFERRED EMBODIMENT

One embodiment of the invention will be described with reference to the accompanying drawings.

Figure 1:
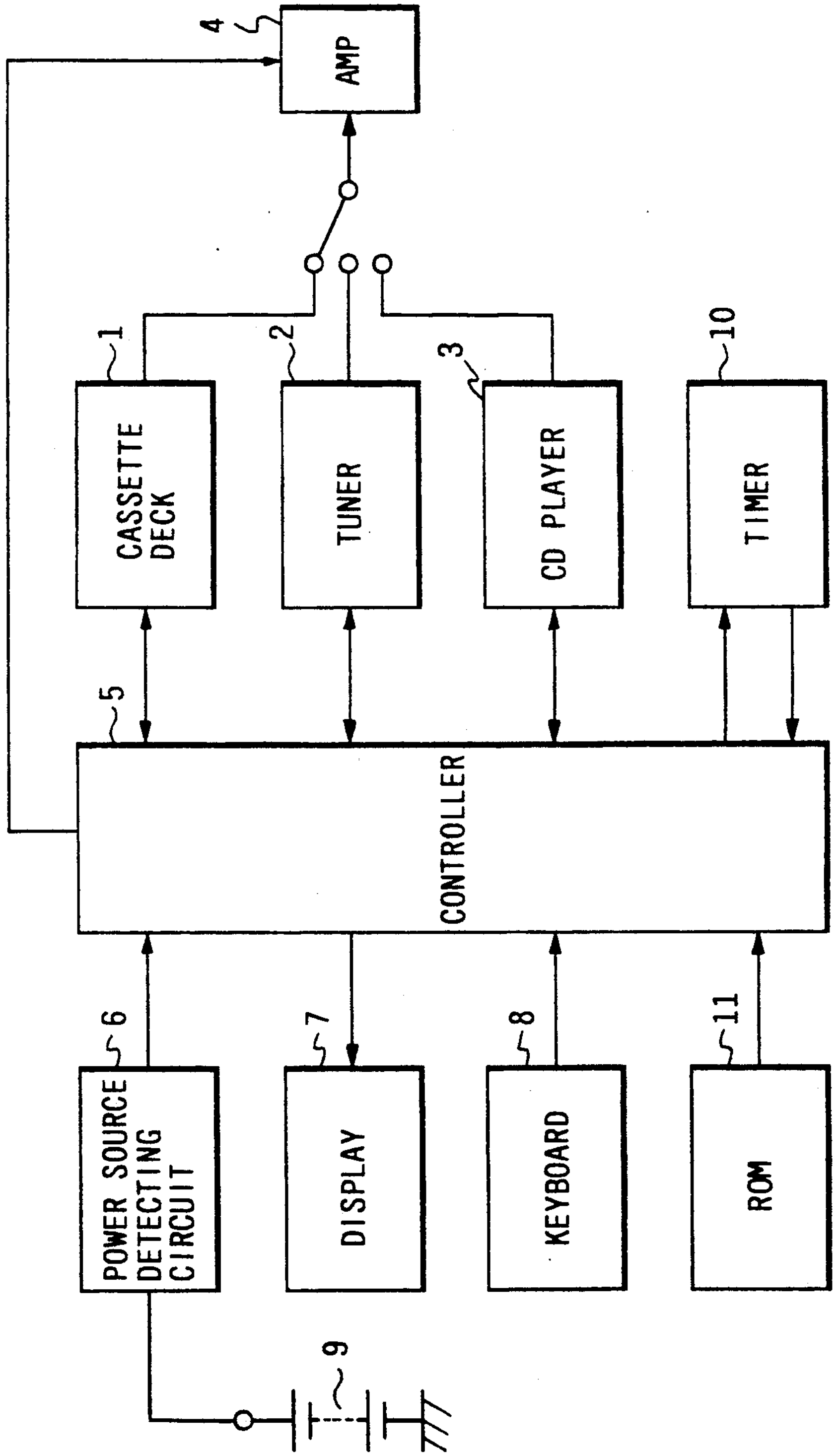
FIG. 1 is a block diagram showing the arrangement of one embodiment of this invention.

FIG. 1 shows a vehicular audio apparatus having an anti-theft device according to the embodiment of the invention. The audio apparatus, as shown in FIG. 1, comprises a cassette deck 1, a tuner 2, a CD (compact disk) player 3, and an amplifier 4, all of which are controlled by a controller 5. The controller 5, made up of a microcomputer, operates according to a program stored in an external ROM 11. A power source detecting circuit 6, a display unit 7, and a keyboard 8 are connected to the controller 5.

When a battery 9 is electrically connected to the audio apparatus, the power detecting circuit 6 produces a power detection signal on the basis of an output voltage of the power source.

When the battery 9 is connected to the audio apparatus, the output voltage of the battery 9 is supplied, as a supply voltage, to the controller 5, the power detecting circuit 6, and a timer (described later), bypassing an accessory switch (not shown) of vehicle. However, it should be noted that, for the purpose of detecting the on-off operation of the accessory switch, the output voltage of the battery 9 is also supplied to the controller 5 through the accessory switch.

The display unit 7 is, for example, a liquid crystal display, which displays operating statuses of the cassette deck 1, the tuner 2, the CD player 3 and the amplifier 4, operated results of the keyboard 8, and a code input request (described later). A drive circuit for driving the display unit 7 is included in the controller 5.

The keyboard 8 has ten-keys, play keys for applying instructions to the cassette deck 1, the tuner 2, the CD player 3 and the amplifier 4, a stop key, and command keys such as station selecting keys (those keys not shown).

A timer 10 is connected to the controller 5. The timer 10 starts its time measuring operation in response to a reset/start signal from the controller 5, and provides a timeover signal to the controller when measuring a predetermined period of time (720 hours for instance).

Figure 2:
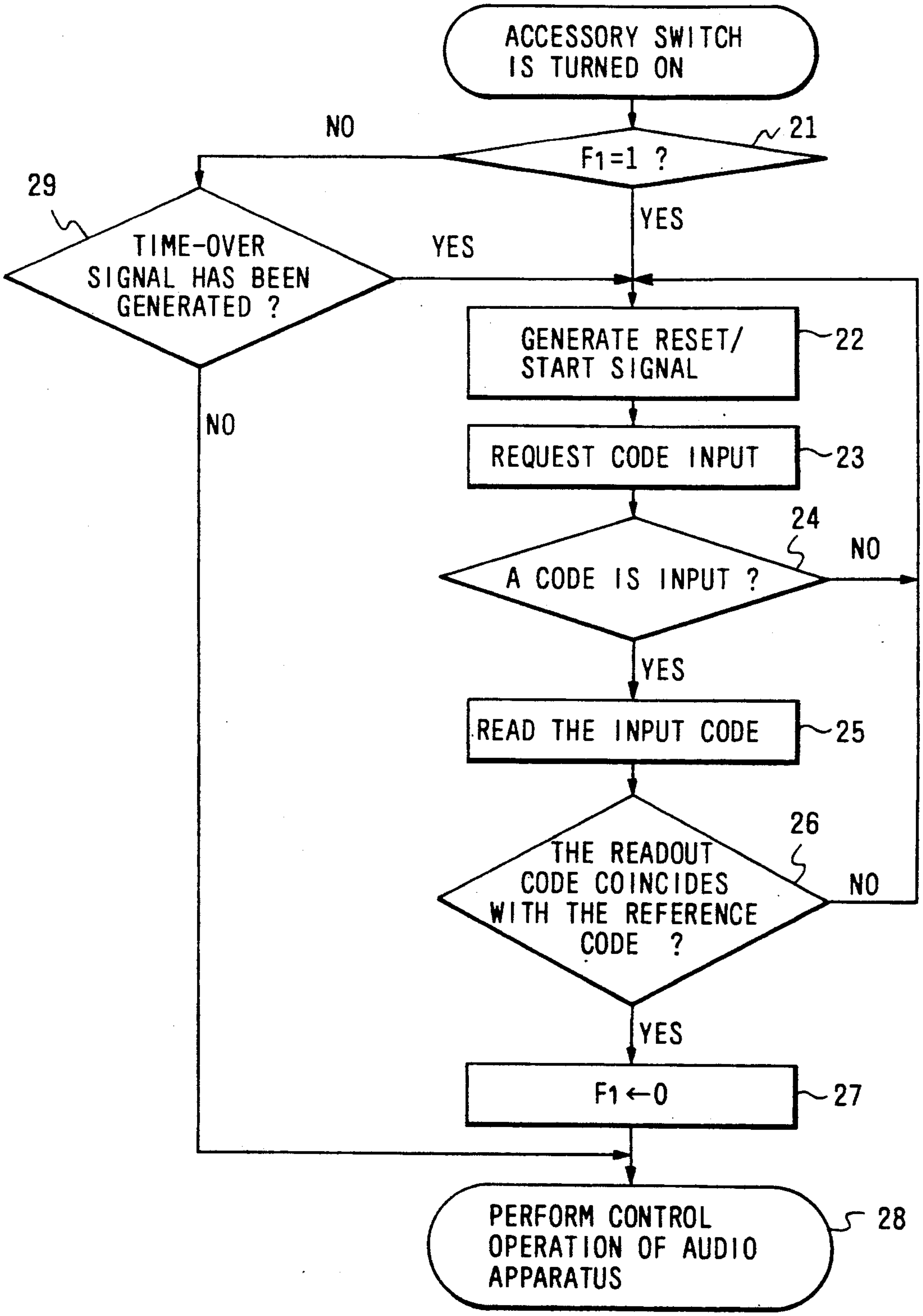
FIG. 2 is a flow chart for a description of the operation of a controller in the embodiment shown in FIG. 1.

The operation of the audio apparatus equipped with the anti-theft device thus organized will be described with reference to the operation of the controller 5 shown in FIG. 2.

When the accessory switch is turned on, the controller 5 judges whether or not a power source off flag $F_1$ is "1" (Step 21). Once the battery 9 is disconnected from the audio apparatus, the power source detecting circuit 6 does not output the power source detection signal. When the battery 9 is reconnected to the audio apparatus, the power source detection signal is immediately provided to the controller 5 and thereby the power source off flag $F_1$ is set to "1" in the controller 5. Since $F_1=1$ means the previous disconnection of the battery 9, the reset/start signal is provided to the timer 10 (Step 22). In response to the reset/start signal, the timer 10 starts its time measuring operation from a reference value (zero (0) for instance).

Thereafter, the controller 5 causes the display unit 7 to display a code input request such as "Input the security code through the keyboard" (Step 23), and judges whether or not the code has been input through the keyboard 8 (Step 24). When keys of the keyboard 8 are operated, a code signal corresponding to the operated keys is supplied to the controller 5, where it is held until read out by an input buffer (not shown). The controller judges it from the contents of the input buffer whether or not a code has been input.

When it is judged that no code has been input, Step 22 is effected again, so that the controller resets and starts the timer 10 and requests a user to input a code.

When it is judged that a code has been input, the controller reads the code (Step 25), and compares the input code with a reference code predetermined (Step 26). The reference code has been written in the ROM 11 in advance, so as to be read out by the controller 5 for the comparison.

When it is judged that the input code coincides with the reference code, the controller resets the power source off flag $F_1$ to "0" (Step 27) and starts controlling the operation of the audio apparatus (Step 28). That is, in response to an operating instruction provided for the cassette deck 1, the tuner 2, the CD player 3 or the amplifier 4 through key operation of the keyboard 8, the controller 5 controls the operation of the cassette deck 1, the tuner 2, the CD player 3, or the amplifier 4.

When the input code does not coincide with the reference code, then similarly as in the case where no code has been input, Step 22 is effected again, so that the controller resets and starts the timer 10 and requests the user to input a code. This means that the controller 5 does not control the operation of the audio apparatus, i.e., inhibits the operation of the audio apparatus.

On the other hand, if, in Step 21, it is judged that $F_1=0$, meaning that after the above-described coincidence of the input code with the reference code the battery 9 is kept connected to the audio apparatus, it is judged whether or not the time-over signal has been produced (Step 29). If no time-over signal has been produced by the timer 10 yet, the predetermined period of time has not passed from the time instant that the code was input before. Since, it is unnecessary to request inputting the code, Step 28 is effected, so that the controller controls the operation of the audio apparatus.

If it is judged that the time-over signal has been produced by the timer 10, the predetermined period of time has already passed, and therefore Step 22 is effected. Hence, similarly as in the case of $F_1=1$, the controller 5 carries out the operations of Steps 22 through 26. That is, the controller 5 provides the reset/start signal to the timer 10, causes the display unit 7 to display the code input request, and judges whether or not a code has been input through the keyboard 8. When it is judged that a code has been input, then the controller reads the input code and compares it with the reference code. When the codes coincide with each other, then Step 28 is effected, so that the controller starts controlling the operation of the audio apparatus.

In the above-described embodiment, when the predetermined period of time has passed from the time instant the code was input previously, the inputting of the code is requested again. The anti-theft device may be so modified that the code inputting request is issued whenever the accessory switch of the vehicle has been operated a predetermined number of times (100 times for instance).

Furthermore in the above-described embodiment, the timer is provided outside of the controller 5; however, the anti-theft device may be so designed that the time measuring operation is performed in the controller according to a program.

In the anti-theft device of the invention, when the electric apparatus is connected to the power source after the previous disconnection of the former to the latter, the operation of the electric apparatus is inhibited until the predetermined code is input. Furthermore, the operation of the electric apparatus is inhibited unless the predetermined code is input every predetermined period of time. Hence, even when the electric apparatus is stolen with the power source connected to it, it cannot operate until the code is identified by the thief. Thus the anti-theft device will be useful to counteract the theft of an electric apparatus from a vehicle.

Furthermore, since the predetermined code is input every predetermined period of time, a user can be prevented from forgetting the code. Thus, this will eliminate the problem that when the battery is replaced because of termination of its service life, the electric apparatus cannot operate because the user forgets the code.

What is claimed is:

1. An anti-theft device for a vehicular electric apparatus, comprising:

connection detecting means for detecting a disconnection of the electric apparatus from a power source used to supply power to the electric apparatus;

input means for allowing an input code to be input to the apparatus;

code detecting means for detecting an input through said input means of a input code;

timing means for keeping track of an amount of time that has elapsed since said predetermined code has been entered to said apparatus through said input means and for issuing a time over signal after a predetermined time has elapsed since said predetermined code has been entered;

first inhibition controlling means for inhibiting an operation of the electric apparatus, until said predetermined code is detected by said code detecting means, if a situation occurs such that said connection detection means has detected that the electric apparatus has been connected to said power source after said connection detection means had detected that the electric apparatus has been disconnected from said power source; and second inhibition controlling means for inhibiting an operation of the electric apparatus, until said predetermined code is detected by said code detecting means, when said time over signal is issued by said timing means.

2. An anti-theft device for a vehicular electric apparatus, comprising:

connection detecting means for detecting a disconnection of the electric apparatus from a power source used to supply power to the electric apparatus;

input means for allowing an input code to be input to the apparatus;

code detecting means for detecting an input through said input means of a input code;

actuating switch means for turning said apparatus on and off;

actuating switch counter means for counting a predetermined number of times in which said actuating switch means turns said apparatus on after said predetermined code has been entered;

first inhibition controlling means for inhibiting an operation of the electric apparatus, until said predetermined code is detected by said code detecting means, if a situation occurs such that said connection detection means has detected that the electric apparatus has been connected to said power source after said connection detection means had detected that the electric apparatus has been disconnected from said power source; and second inhibition controlling means for inhibiting an operation of the electric apparatus, until said predetermined code is detected by said code detecting means, when said actuating switch counter means has counted said predetermined number of times.

* * * * *